United States Patent
Deng et al.

(10) Patent No.: US 11,834,078 B2
(45) Date of Patent: Dec. 5, 2023

(54) LEVITATION, PROPULSION AND GUIDANCE INTEGRATED MAGNETIC LEVITATION SYSTEM AND IMPROVEMENT METHOD OF GUIDANCE AND LEVITATION

(71) Applicant: Southwest Jiaotong University, Chengdu (CN)

(72) Inventors: Zigang Deng, Chengdu (CN); Hongfu Shi, Chengdu (CN); Yuqing Xiang, Chengdu (CN); Jun Zheng, Chengdu (CN); Huan Huang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 170 days.

(21) Appl. No.: 17/539,409

(22) Filed: Dec. 1, 2021

(65) Prior Publication Data
US 2022/0089196 A1 Mar. 24, 2022

(30) Foreign Application Priority Data
Jul. 7, 2021 (CN) .......................... 202110768298.0

(51) Int. Cl.
*B61B 13/08* (2006.01)
*B60L 13/04* (2006.01)

(52) U.S. Cl.
CPC .............. *B61B 13/08* (2013.01); *B60L 13/04* (2013.01); *B60L 2200/26* (2013.01)

(58) Field of Classification Search
CPC ...... B61B 13/08; B60L 13/04; B60L 2200/26; B60L 2260/22; B60L 2260/26; B60L 13/10; B60L 13/03; B60L 2240/12; B60L 13/06; B60L 15/20; B61F 11/00; E01B 25/30

See application file for complete search history.

(56) References Cited

U.S. PATENT DOCUMENTS

| 5,282,424 A * | 2/1994 | O'Neill | ................... B61B 13/08 104/282 |
| 5,394,807 A * | 3/1995 | Sink | ...................... B60L 13/006 104/294 |
| 6,095,268 A * | 8/2000 | Jones, Jr. | .............. B60L 15/007 180/65.6 |
| 2010/0090546 A1* | 4/2010 | Lopatinsky | ............ A63H 18/10 310/12.21 |
| 2018/0159416 A1* | 6/2018 | Julen | ....................... E21B 19/08 |

(Continued)

FOREIGN PATENT DOCUMENTS

| CN | 1569511 A | 1/2005 |
| CN | 109094421 A | 12/2018 |
| CN | 111284330 A | 6/2020 |

*Primary Examiner* — Mark T Le

(57) ABSTRACT

A levitation, propulsion and guidance integrated magnetic levitation system and an improvement method of levitation and guidance. The system includes a maglev train and a maglev track. The maglev train is provided with a permanent magnet array. The maglev track is provided with a driving device and a levitation driving device in sequence along a running direction of the maglev train. An iron plate is arranged in the middle of the maglev track. The driving device accelerates the maglev train from 0 to take-off velocity. The levitation driving device provides a driving force and a levitation force for the maglev train. The iron plate enables the centered running of the maglev train.

10 Claims, 8 Drawing Sheets

(56) References Cited

U.S. PATENT DOCUMENTS

| | | | |
|---|---|---|---|
| 2022/0032781 A1* | 2/2022 | Veltman | B60L 15/2009 |
| 2023/0087850 A1* | 3/2023 | Asada | B60B 19/006 |
| | | | 180/55 |

\* cited by examiner

LEVITATION, PROPULSION AND GUIDANCE INTEGRATED MAGNETIC LEVITATION SYSTEM AND IMPROVEMENT METHOD OF GUIDANCE AND LEVITATION

CROSS-REFERENCE TO RELATED APPLICATIONS

This application claims the benefit of priority from Chinese Patent Application No. 202110768298.0, filed on Jul. 7, 2021. The content of the aforementioned application, including any intervening amendments thereto, is incorporated herein by reference.

TECHNICAL FIELD

The present application relates to magnetic levitation transportation equipment, and more particularly to a levitation, propulsion, and guidance integrated magnetic levitation system and an improvement method of guidance and levitation.

BACKGROUND

Maglev train is driven by magnetic thrust from a linear motor, where the non-contact levitation and guidance between the train and the track are enabled by electromagnetic force. The train is levitated under the action of the magnetic force of the track, so it is only subjected to air resistance while traveling, reducing the friction resistance.

With respect to the existing maglev trains, a driving device is generally arranged on the maglev track and two sides of the maglev track are respectively provided with a levitation device, where the driving device and the levitation device are isolated. In the startup process of the train, the driving device and the levitation device are simultaneously started, so the train is simultaneously affected by a driving magnetic field and a levitation magnetic field during the startup process. Currently, due to the extremely low running speed, the train suffers a small levitation force but a considerable magnetic resistance. In this case, the train needs to overcome a greater magnetic resistance to run, affecting the acceleration efficiency. In addition, the middle of the maglev track is provided with guidance magnetic strips to enable the stable guidance.

Currently, there is a lack of a desirable guidance scheme in the field of flat electrodynamic-suspension levitation, and the levitation, guidance and propulsion components are arranged separately, leading to an insufficient loading capacity. In view of this, there is an urgent need to develop a levitation, propulsion and guidance integrated structure, and a method for effectively enhancing the levitation performance.

SUMMARY

To overcome the defects in the prior art that the exiting magnetic levitation systems have large equipment size, large space occupation and low utilization rate of magnetic field, and fail to enable the integration of levitation, propulsion and guidance, a levitation, propulsion, and guidance integrated magnetic levitation system and a levitation driving method are provided herein. The technical solutions of the present disclosure can realize the integration of the driving device and the levitation device, to reduce the size of the entire magnetic levitation system, improve the utilization of magnetic field, and realize the integration of the levitation, propulsion and guidance.

The technical solutions of the disclosure are described below.

In a first aspect, the disclosure provides a levitation, propulsion and guidance integrated magnetic levitation system, comprising:
a maglev train; and
a maglev track;
wherein the maglev track is provided with a driving device and a levitation driving device in sequence along a running direction of the maglev train;
the driving device is only configured to provide a first driving force for acceleration of the maglev train at a start-up stage; and
the levitation driving device is configured to provide a second driving force and a levitation force for the maglev train after the maglev train is accelerated by the driving device.

In an embodiment, the driving device comprises a plurality of alternating coils uniformly arranged along an extending direction of the maglev track; and the plurality of alternating coils are connected to an external power supply device via a power interface.

In an embodiment, the levitation driving device comprises a plurality of alternating coils uniformly arranged along an extending direction of the maglev track; each of the plurality of alternating coils is embedded with an induction levitation plate; and an isolating ring is arranged between the induction levitation plate and each of the plurality of alternating coils for complete insulation isolation.

In an embodiment, the induction levitation plate is made of a metal material with a relative magnetic permeability equal to or larger than 1 and an electrical resistivity greater than $3*10^7$ S/m.

In an embodiment, the induction plate is an aluminum plate, a copper plate or a silver plate.

In an embodiment, a middle portion of the induction levitation plate is embedded with a guidance magnetic strip; the guidance magnetic strip is parallel to the running direction of the maglev train; and the guidance magnetic strip is made of a metal strip with a relative magnetic permeability greater than 800.

In an embodiment, the guidance magnetic strip is an iron strip.

In an embodiment, the induction plate is further embedded with a plurality of copper sheets arranged in parallel; and the plurality of copper sheets are symmetrically arranged on two sides of the guidance magnetic strip and are perpendicular to the guidance magnetic strip.

In an embodiment, an auxiliary wheel is rotatably connected to a bottom of the maglev train through a rotating shaft; and the auxiliary wheel is spherical.

In a second aspect, the present disclosure provides a levitation driving method based on the above levitation driving and guidance integrated magnetic levitation system, comprising:
(S1) parking the maglev train on the maglev track provided with the driving device; and accelerating the maglev train by the driving device to ensure that when the maglev train arrives at a section of the maglev track where the levitation driving device is provided, a running speed of the maglev train is not less than take-off velocity; and
(S2) allowing the maglev train to enter the section of the maglev track where the levitation driving device is provided at a speed higher than take-off velocity; and simultaneously applying, by the levitation driving device, the levitation and propulsion forces to the maglev train in a running state to further accelerate the maglev train; and levitate the maglev train until the maglev train reaches a prescribed running speed.

In the prior art, it has only been reported in Japan to use a splayed coil to achieve the guidance of the electrodynamic-suspension system. Generally, the track is adjusted to be V-shaped and arc-shaped such that a component of the levitation force can be used to provide a part of the guidance force. However, this design will make the structure of the aluminum plate complex and the guidance unstable, and the large aluminum plate will aggravate the eddy current loss and lead to significant heat generation.

Compared with the prior art, the present disclosure has the following beneficial effects.

1. The magnetic levitation system provided herein includes a maglev train and a maglev track, where the permanent magnet array is arranged on the maglev train; and along the running direction of the maglev train, the maglev track includes a first working section provided with a driving device only configured to drive the maglev train and a second working section provided with a levitation driving device configured to drive and levitate the maglev train.

When the magnetic levitation system provided herein is operating, the maglev train is parked on the first working section of the maglev track, and then thrust by the driving device to reach the second working section at a speed higher than the take-off velocity. In view of the higher take-off velocity, a fast-changing relative displacement occurs between the permanent magnet array and the induction levitation plate, that is, the induction levitation plate can cut the magnetic induction lines quickly. Therefore, according to the law of electromagnetic induction, a strong induction current will be generated inside the induction levitation plate, which will further lead to the generation of a strong eddy current and an induction magnetic field. The magnetic field interacts with the permanent magnetic field to produce a levitation force to realize the levitation of the maglev train, where the levitation force increases with the increase of speed first, and then tends to be stable.

In the present disclosure, the starting stage of the maglev train is divided into a driving stage and a levitation driving stage. In the driving stage, the maglev train is accelerated such that the maglev train has a higher take-off velocity to enter the levitation driving stage. According to the law of electromagnetic induction, a higher take-off velocity will cause the induction levitation plate to cut the magnetic induction lines quickly to obtain a larger levitation force to realize the levitation of the maglev train, that is, the required levitation force is derived from the larger take-off velocity of the maglev train rather than a large-size levitation device in the conventional technology.

The present disclosure divides the running process of the maglev train into an accelerating stage and a levitation accelerating stage to achieve the levitation of the maglev train at a higher take-off velocity. Based on this, the bulky levitation system is not required, and the induction levitation plate used to generate a levitation force is divided into multiple smaller plates, and then respectively embedded in each alternating coil to realize the integration of the driving device and the levitation device. Moreover, the integrated system can share the same permanent magnet array, thus greatly reducing the volume of the equipment. The discrete aluminum plate tracks can reduce eddy current loss. Moreover, after integrated with the propulsion coil and the guide iron strip, the conductor plate integrates the function of levitation, guidance, and propulsion.

Moreover, in the present disclosure, the driving system and the levitation system are integrated such that the maglev train will locate directly above the driving and levitation magnetic fields during the running process. By comparison, the driving system and the levitation system are not coaxial in the conventional magnetic levitation system. Therefore, the present disclosure can make full use of the levitation magnetic field and greatly improve the utilization rate of the magnetic field.

2. The levitation driving device of the disclosure includes an alternating coil and an induction levitation plate embedded in the alternating coil, and an isolating ring is arranged between the induction levitation plate and the alternating coil to enable the insulated isolation there between to avoid the mutual interference, ensuring the normal operation of the levitation driving device.

At the same time, the above structure is simple, and can effectively simplify the overall structure of the system, improve reliability and stability, and reduce the manufacture cost of the maglev train.

3. In the system provided herein, a middle portion of the induction levitation plate is provided with a guidance magnetic strip, which is parallel to the running direction of the maglev train. A centerline of the permanent magnet array in the maglev train coincides with a centerline of the guidance magnetic strip, that is, the permanent magnet array is located directly above the guidance magnetic strip and is symmetrical with respect to the centerline of the guidance magnetic strip. At this time, the attraction produced by the guidance magnetic strip to the permanent magnet array is opposite to the levitation force applied to the maglev train, and is far smaller than the levitation force such that the maglev train is kept in a stable running state. When a lateral displacement happens to the maglev train, it will inevitably lead to the uneven distribution of the guidance magnetic strip on two sides of the centerline of the permanent magnet array, that is, the guide magnetic strip experiences an offset relative to the permanent magnet array. In this case, a magnetic force between the guidance magnetic strip and the permanent magnet array will be deflected, and the deflection direction of the magnetic force is opposite to an offset direction of the train, to pull the maglev train back to a correct running position to ensure the safe and stable running of the maglev train.

The above structure and principle are simple, which is beneficial to reducing the cost and ensuring the reliability and stability of the equipment.

4. The induction levitation plate is provided with a plurality of copper sheets arranged in parallel, which are symmetrically arranged on two sides of the guidance magnetic strip and are perpendicular to the guidance magnetic strip. The copper sheets can reduce the resistance of the induction levitation plate, to increase the eddy current of the induction levitation plate, thereby increasing the levitation force.

Moreover, the solution mentioned above can effectively reduce the consumption of copper, thus reducing the manufacturing cost of the entire equipment, and achieving a balance between cost and levitation performance.

5. In addition, a spherical auxiliary wheel is provided at the bottom of the maglev train. Compared with the traditional cylindrical wheels, two sides of the spherical wheel are inclined upward such that the contact points between the two sides of the spherical wheel and the maglev track are synchronously lifted. When the maglev train enters the levitation state, the contact surfaces between the spherical wheel and the sides of the maglev track are significantly narrowed, which can effectively reduce the friction and collision between the auxiliary wheel and the maglev track and improve the operation stability and reliability of the equipment.

Figure 1:
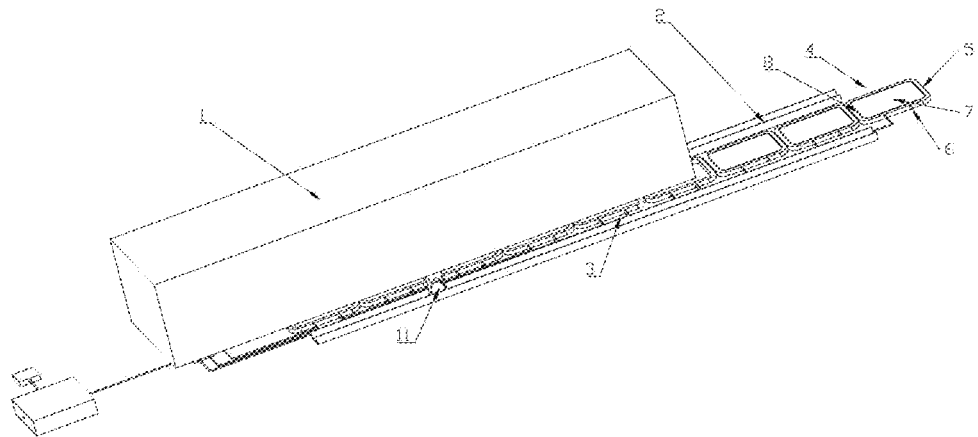
FIG. 1 schematically shows an overall structure of a levitation driving and guidance integrated magnetic levitation system according to an embodiment of the present disclosure.

In the drawings, 1, maglev train; 2, maglev track; 3, driving device; 4, levitation driving device; 5, alternating coil; 6, power interface; 7, induction levitation plate; 8, isolating ring; 9, guidance magnetic strip; 10, copper sheet; 11, auxiliary wheel; 12, permanent magnet array; 13, first induction conductor plate; 14, Halbach permanent magnet; and 15, second induction conductor plate.

DETAILED DESCRIPTION OF EMBODIMENTS

To make the object, technical solutions, and beneficial effects of the disclosure clearer, the present disclosure will be described in detail below with reference to the accompanying drawings and embodiments.

Embodiment 1

As shown in FIGS. 1-4, a levitation driving and guidance integrated magnetic levitation system is provided, which includes a maglev train 1 and a maglev track 2. A permanent magnet array 12 is fixedly arranged in the maglev train 1. In an embodiment, the permanent magnet array 12 is a Halbach array.

The maglev tracks 2 are provided with a driving device 3 and a levitation driving device 4 in sequence along a running direction of the maglev train 1. The driving device 3 includes a plurality of alternating coils 5 uniformly arranged along an extending direction of the maglev track 2. Each alternating coil 5 is provided with a power interface 6. The alternating coil 5 of the first stage is connected to an external power supply device via the power interface 6, and the remaining alternating coils 5 are respectively with their adjacent alternating coils 5 via the power interface 6 to enable the conduction of all the alternating coils 5.

The levitation driving device 4 includes the plurality of alternating coils 5 uniformly arranged along an extending direction of the maglev track 2. Each alternating coil 5 is embedded with an induction levitation plate 7. The induction levitation plate 7 is made of a metal with a relative permeability equal to or larger than 1 and a resistivity greater than $3*10^7$ S/m. In an embodiment, the induction levitation plate 7 is an aluminum plate, a copper plate or a silver plate. The induction levitation plate 7 is inserted into the alternating coil 5, and an isolating ring 8 is arranged between the induction levitation plate 7 and the alternating coil 5, where the isolating ring 8 has a square cross section. According to actual needs, the isolating ring 8 is made of an insulating material such as Bakelite and insulating rubber, and the thickness of the isolating ring 8 is not less than 5 mm. Through the isolating ring 8, a surface of the alternating coil 5 and a surface of the induction suspension plate 7 directly opposite thereto are completely isolated. At the same time, a top surface of the induction levitation plate 7 needs to be exposed to the outside to enable a normal operation of the levitation suspension plate 7.

Moreover, a bottom of the maglev train 1 is uniformly provided with a plurality of auxiliary wheels 11, which are spherical and are rotatably connected to the maglev train 1 via a connecting shaft.

Embodiment 2

Figure 5:
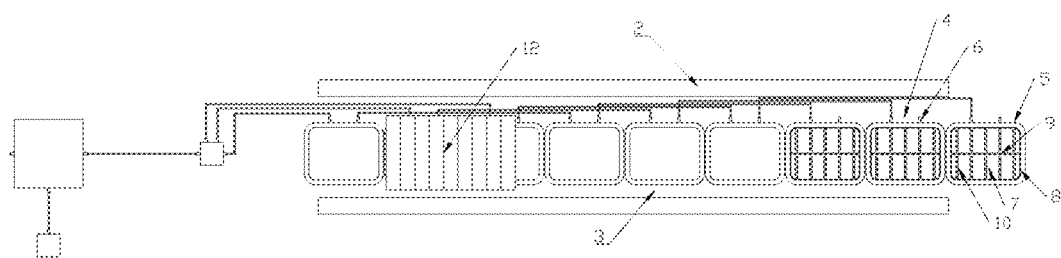
FIG. 5 schematically illustrates a structure of the levitation driving and guidance integrated magnetic levitation system according to Embodiment 2 of the present disclosure.
Figure 6:
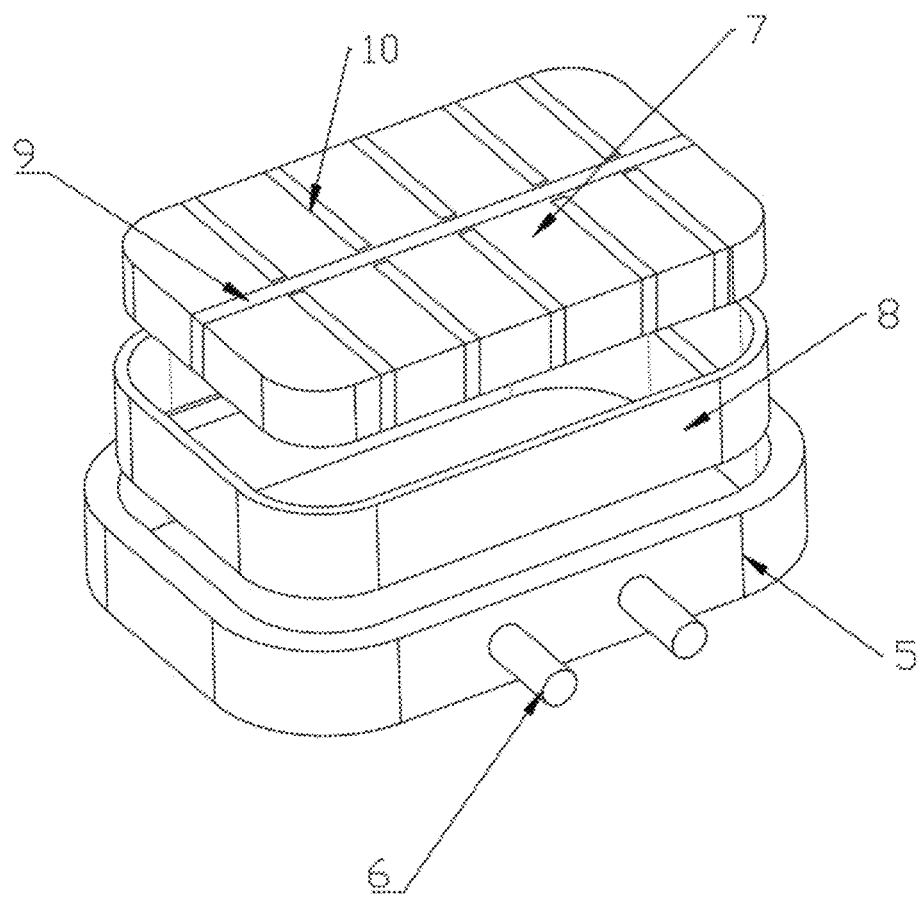
FIG. 6 schematically shows a structure of the levitation driving device according to an embodiment of the present disclosure.

Referring to an embodiment shown in FIGS. 5-6, a levitation driving and guidance integrated magnetic levitation system based on Embodiment 1 includes a maglev train 1 and a maglev track 2. The maglev tracks 2 are provided with a driving device 3 and a levitation driving device 4 in sequence along a running direction of the maglev train 1. The driving device 3 includes a plurality of alternating coils 5 uniformly arranged along an extending direction of the maglev track 2.

The levitation driving device 4 includes the alternating coils 5 uniformly arranged along an extending direction of the maglev track 2. Each alternating coil 5 is embedded with an induction levitation plate 7 inside. The isolating ring 8 is arranged between the induction levitation plate 7 and the alternating coil 5. A middle of the induction levitation plate 7 is embedded with a guidance magnetic strip 9. The guidance magnetic strip 9 is parallel to a running direction of the maglev train 1. The guidance magnetic strip 9 is made of a metal strip with a relative permeability greater than 800, preferably, an iron strip.

A plurality of copper sheets 10 in parallel are symmetrically arranged at two sides of the guidance magnetic strip 9. The copper sheets 10 are embedded in the induction levitation plate 7, and are perpendicular to the guidance magnetic strip 9.

Figure 7:
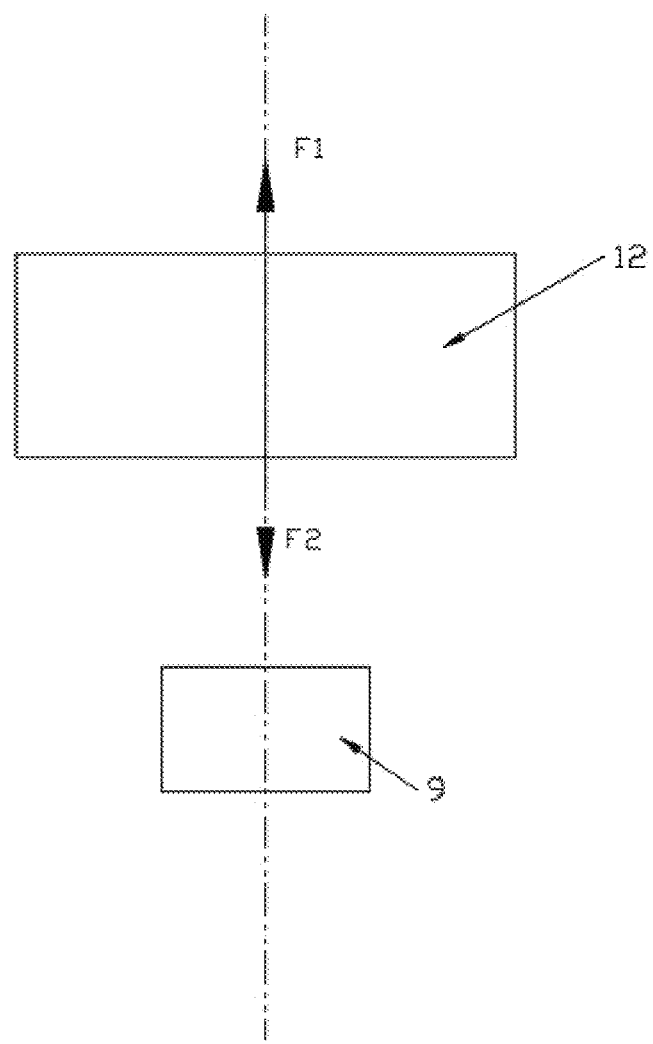
FIG. 7 illustrates a maglev train in a normal working state in Embodiment 2 of the present disclosure.

As shown in FIG. 7, when the maglev train 1 is running stably, a centerline of the permanent magnet array 12 coincides with a centerline of the guidance magnetic strip 9. At this time, a magnetic force between the guidance magnetic strip 9 and the permanent magnet array 12 is in a vertical direction, that is, the permanent magnet array is subjected to a levitation force (F1) and an attraction force (F2), where F1 and F2 are in the same line but opposite directions.

When the maglev train 1 experiences a lateral displacement, a position relationship between the permanent magnet array 12 and the guidance magnetic strip 9 is shown in FIG.

Figure 8:
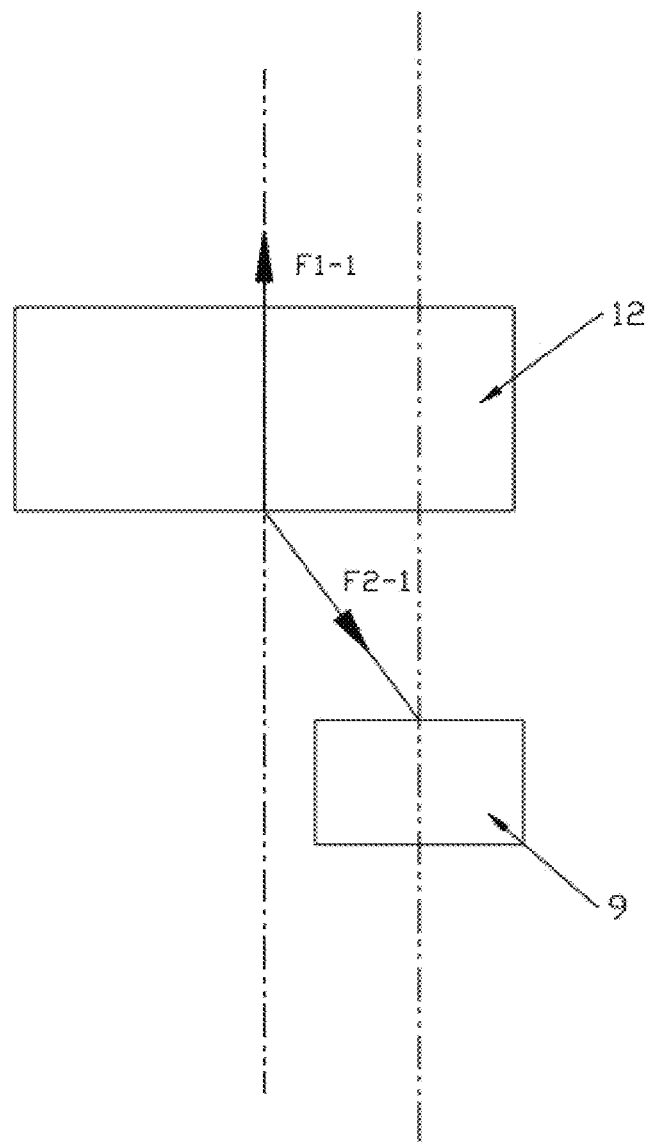
FIG. 8 schematically shows an offset state of a maglev train in Embodiment 2 of the present disclosure.
Figure 9:
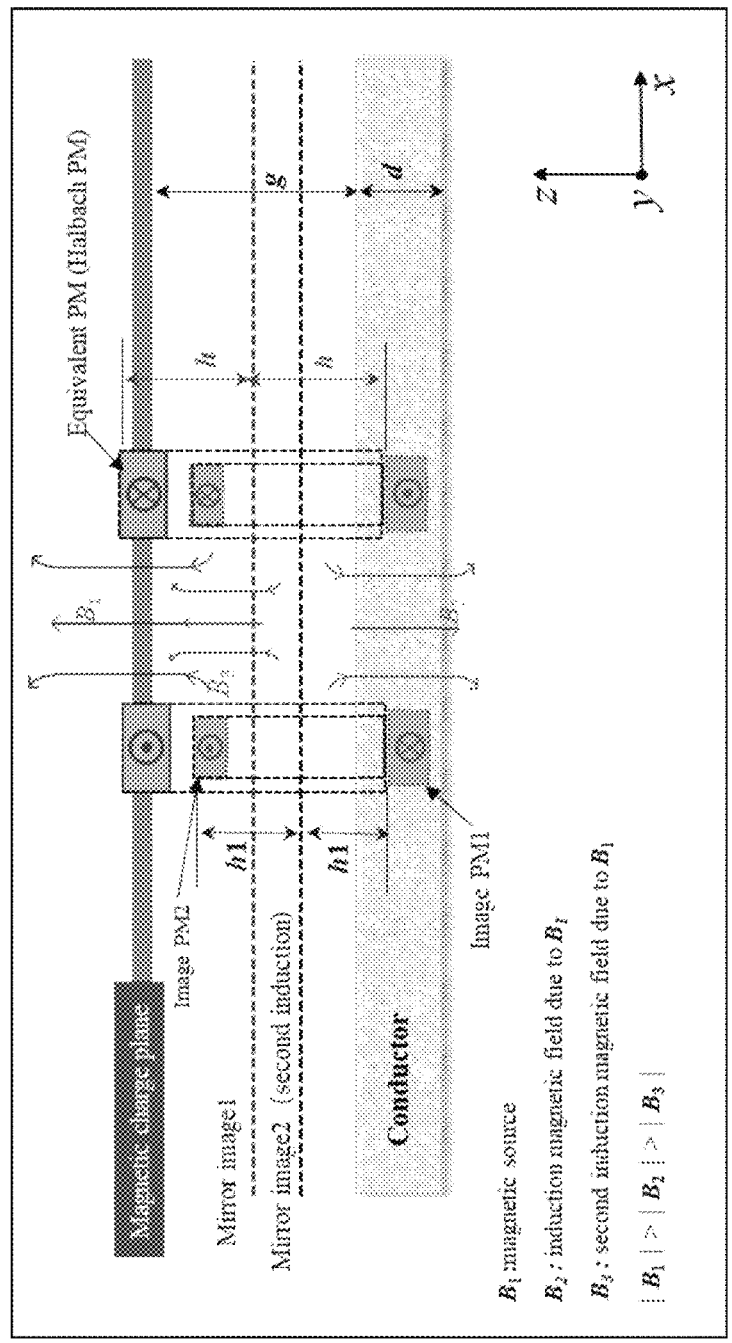
FIG. 9 is a cross-section view of a second magnetic induction mirror method model in Embodiment 4 of the present disclosure.
Figure 10:
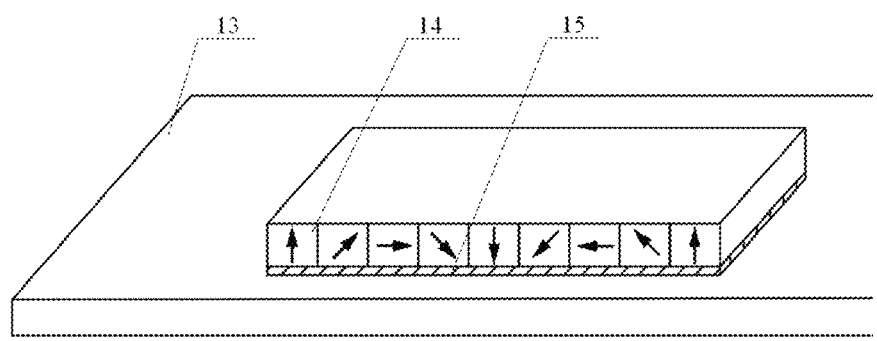
FIG. 10 shows a structure of a Halbach permanent magnet in Embodiment 4 of the present disclosure.

8. As the permanent magnet array 12 moves with the maglev train 1, that is, the guide magnetic strip 9 shifts relative to the permanent magnet array 12, a magnetic force between the guidance magnetic strip 9 and the permanent magnet array 12 will be deflected, and a deflection direction of the magnetic force is opposite to a lateral displacement direction of the maglev train 1, so as to pull the maglev train 1 back to the correct running position to ensure the safe and stable running of the maglev train 1, where a levitation force (F1-1) and an attraction force (F2-1) applied to the permanent magnet array are shown in FIG. 8.

The above structure and principle are simple, which is beneficial to reducing the cost and enhancing the reliability and stability of the equipment.

Embodiment 3

Provided herein is a levitation driving method based on the levitation driving and guidance integrated magnetic levitation system, which includes the following steps.

(S1) The maglev train 1 is parked on the maglev track 2 provided with the driving device 3. When the maglev train 1 needs to run, the driving device 3 is provided with an alternating current, which can produce a driving magnetic field. The driving magnetic field interacts with the permanent magnet array 12 to drive the maglev train 1 to slide on the maglev track 2, and at this time, it is required to ensure that a speed of the maglev train is not less than a take-off velocity of levitation while leaving the driving device 3, where the take-off velocity of levitation is determined according to a weight of the maglev train 1, an acceleration length of the driving device 3 and a size and a power of the levitation driving device 4.

(S2) When the maglev train 1 enter the section of the maglev track 2 provided with the levitation driving device 4 at a speed higher than the take-off velocity of levitation, the alternating coil 5 in the energized levitation driving device 4 will produce a driving magnetic field, and at this time, the induction levitation plate 7 will produce a levitation magnetic field such that the maglev train 1 are simultaneously subjected to a levitation force and a driving force until the maglev train 1 runs in a stable levitation state, that is, a running speed of the maglev train 1 reaches a prescribed speed.

When the magnetic levitation system provided herein is operating, the maglev train is parked on the first working section of the maglev track, and then driven by the driving device to reach the second working section at a speed higher than the take-off velocity of levitation. In view of the higher take-off velocity, a fast-changing relative displacement occurs between the permanent magnet array and the induction levitation plate, that is, the induction levitation plate can cut the magnetic induction lines quickly. Therefore, according to the law of electromagnetic induction, a strong induction current inside the induction levitation plate will further lead to the generation of a strong eddy current and an induction magnetic field. The magnetic field interacts with the permanent magnetic field to produce a levitation force to realize the levitation of the maglev train, where the levitation force increases with the increase of speed first, and then tends to be stable.

In the present disclosure, the starting stage of the maglev train is divided into a driving stage and a levitation driving stage. In the driving stage, the maglev train is accelerated such that the maglev train has a higher take-off velocity to enter the levitation driving stage. According to the law of electromagnetic induction, a higher take-off velocity will cause the induction levitation plate to cut the magnetic induction lines quickly to obtain a larger levitation force to realize the levitation of the maglev train, that is, the required levitation force is derived from the larger take-off velocity of the maglev train rather than a large-size levitation device in the conventional technology.

The present disclosure divides the running process of the maglev train into an accelerating stage and a levitation accelerating stage to achieve the levitation of the maglev train at a higher take-off velocity. Based on this, the bulky levitation system is not required, and the induction levitation plate used to generate a levitation force is divided into multiple smaller plates, and then respectively embedded in each alternating coil to realize the integration of the driving device and the levitation device. Moreover, the integrated system can share the same permanent magnet array, thus greatly reducing the volume of the equipment.

Moreover, in the present disclosure, the driving system and the levitation system are integrated such that the maglev train will locate directly above the driving and levitation magnetic fields during the running process. By comparison, the driving system and the levitation system are not coaxial in the conventional magnetic levitation system. Therefore, the present disclosure can make full use of the levitation magnetic field and greatly improve the utilization rate of the magnetic field.

Embodiment 4

Figure 2:
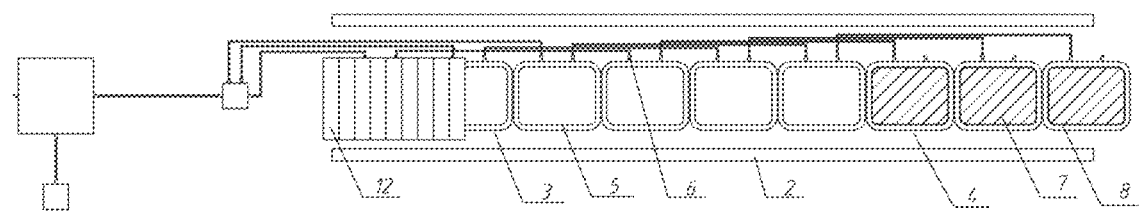
FIG. 2 is a plan view of a magnetic levitation track according to an embodiment of the present disclosure.
Figure 3:
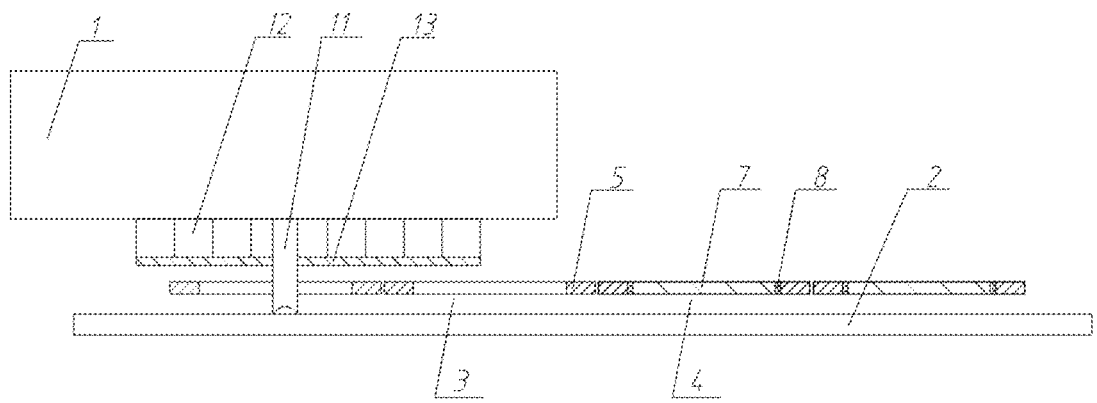
FIG. 3 is a front view of a magnetic levitation track according to an embodiment of the present disclosure.
Figure 4:
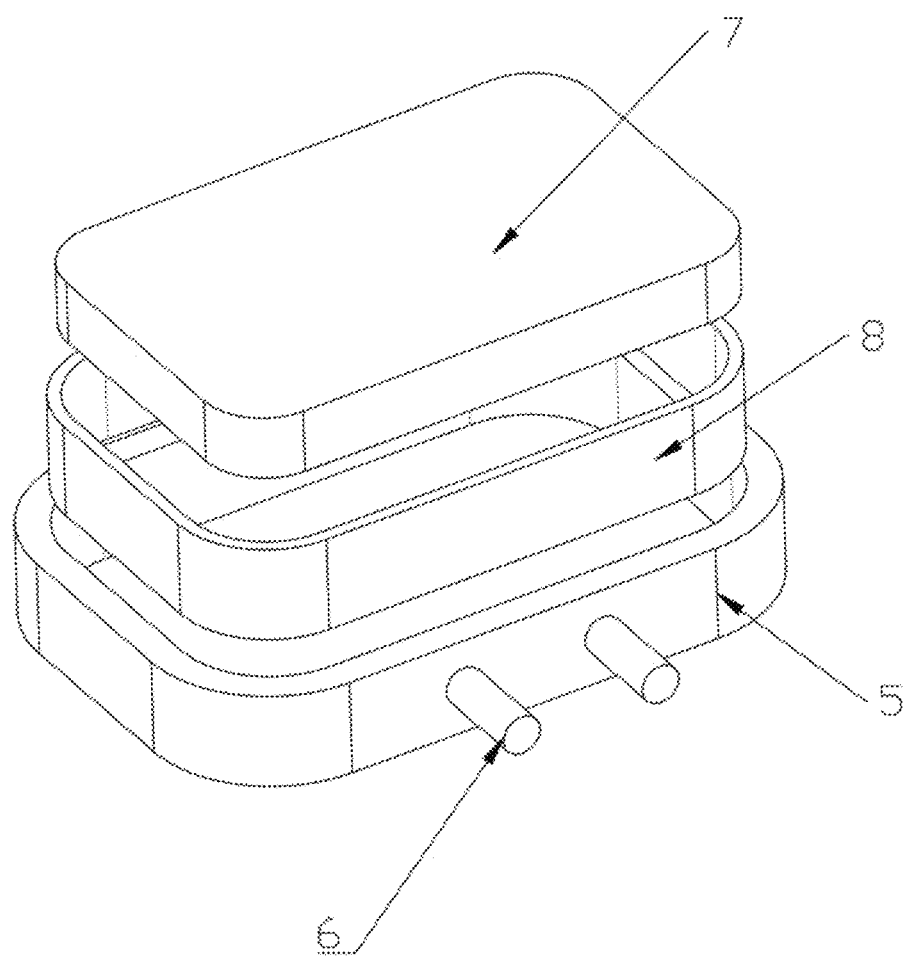
FIG. 4 is an exploded view of a levitation driving device according to an embodiment of the present disclosure.

The moving of the Halbach Permanent magnet (PM) produces a time-varying magnetic source $B_1$ above the conductor. The eddy current creates a reverse time-varying magnetic source $B_2$ due to an alternating component in the discrete geometry of the conductor. $B_2$ is defined as a novel time-varying magnetic source which has an interplay with a conductor, and creates a reverse time-varying magnetic source $B_3$ again according to the Lenz's law. The three Magnetic induction intensities satisfy $|B_1|>|B_2|>|B_3|$, where $B_1$ and $B_2$ have the same polarity in contrast to that of $B_3$, as shown in FIG. 1, and thus the performance is improved. The concept can be described succinctly as "second magnetic induction". The topological structure is illustrated in FIG. 2, which includes a first induction conductor plate 13, a Halbach PM 14, and a second induction conductor plate 15. The second induction conductor plate 15 is arranged on a periphery of the Halbach PM 14 and moves synchronized with the EDW.

The advantages of the second induction are described below.

A good conductor outer ring (such as aluminum, copper, silver, etc.) is arranged on the outer layer of the magnet, which has a gain effect on the suspension performance of the whole system based on the second inducting, and reduces the cost.

After installing the outer ring of the conductor, the volume of the magnet can be reduced based on the original suspension performance, which makes the installation and maintenance of the magnet more convenient, reduces the cost and improves the economic benefit.

What is claimed is:

1. A levitation, propulsion and guidance integrated magnetic levitation system, comprising:
   a maglev train; and
   a maglev track;
   wherein the maglev track is provided with a driving device and a levitation driving device in sequence along a running direction of the maglev train;

the driving device is only configured to provide a first driving force for acceleration of the maglev train at a start-up stage; and the levitation driving device is configured to provide a second driving force and a levitation force for the maglev train after the maglev train is accelerated by the driving device; and the levitation driving device comprises a plurality of alternating coils uniformly arranged along an extending direction of the maglev track; each of the plurality of alternating coils is embedded with an induction levitation plate; and an isolating ring is arranged between the induction levitation plate and each of the plurality of alternating coils for complete insulation isolation.

2. The levitation, propulsion and guidance integrated magnetic levitation system of claim 1, wherein the driving device comprises a plurality of alternating coils uniformly arranged along an extending direction of the maglev track; and the plurality of alternating coils are connected to an external power supply device via a power interface.

3. The levitation, propulsion and guidance integrated magnetic levitation system of claim 1, wherein the induction levitation plate is made of a metal material with a relative magnetic permeability equal to or larger than 1 and an electrical resistivity greater than $3*10^7$ S/m.

4. The levitation, propulsion and guidance integrated magnetic levitation system of claim 3, wherein the induction levitation plate is an aluminum plate, a copper plate or a silver plate.

5. The levitation, propulsion and guidance integrated magnetic levitation system of claim 1, wherein a middle portion of the induction levitation plate is embedded with a guidance magnetic strip; the guidance magnetic strip is parallel to the running direction of the maglev train; and the guidance magnetic strip is made of a metal strip with a relative magnetic permeability greater than 800.

6. The levitation, propulsion and guidance integrated magnetic levitation system of claim 5, wherein the guidance magnetic strip is an iron strip.

7. The levitation, propulsion and guidance integrated magnetic levitation system of claim 5, wherein the induction levitation plate is further embedded with a plurality of copper sheets arranged in parallel; and the plurality of copper sheets are symmetrically arranged on two sides of the guidance magnetic strip and are perpendicular to the guidance magnetic strip.

8. The levitation, propulsion and guidance integrated magnetic levitation system of claim 6, wherein the induction levitation plate is further embedded with a plurality of copper sheets arranged in parallel; and the plurality of copper sheets are symmetrically arranged on two sides of the guidance magnetic strip and are perpendicular to the guidance magnetic strip.

9. The levitation, propulsion and guidance integrated magnetic levitation system of claim 1, wherein an auxiliary wheel is rotatably connected to a bottom of the maglev train through a rotating shaft; and the auxiliary wheel is spherical.

10. A levitation driving method based on the levitation, propulsion and guidance integrated magnetic levitation system of claim 1, comprising:
(S1) parking the maglev train on the maglev track provided with the driving device; and accelerating the maglev train by the driving device to ensure that when the maglev train arrives at a section of the maglev track where the levitation driving device is provided, a running speed of the maglev train is not less than a take-off velocity of levitation; and
(S2) allowing the maglev train to enter the section of the maglev track where the levitation driving device is provided at a speed higher than the take-off velocity of levitation; and simultaneously applying, by the levitation driving device, a levitation force and a driving force on the maglev train in a running state through the levitation driving device to further accelerate the maglev train; and at the same time, levitating the maglev train via a levitation force until a running speed of the maglev train reaches a prescribed speed for a maglev section.

* * * * *